Dec. 12, 1961   J. R. RUSSO   3,013,135
MAGNETIC FLOAT CONTROL
Filed May 6, 1960   2 Sheets-Sheet 1
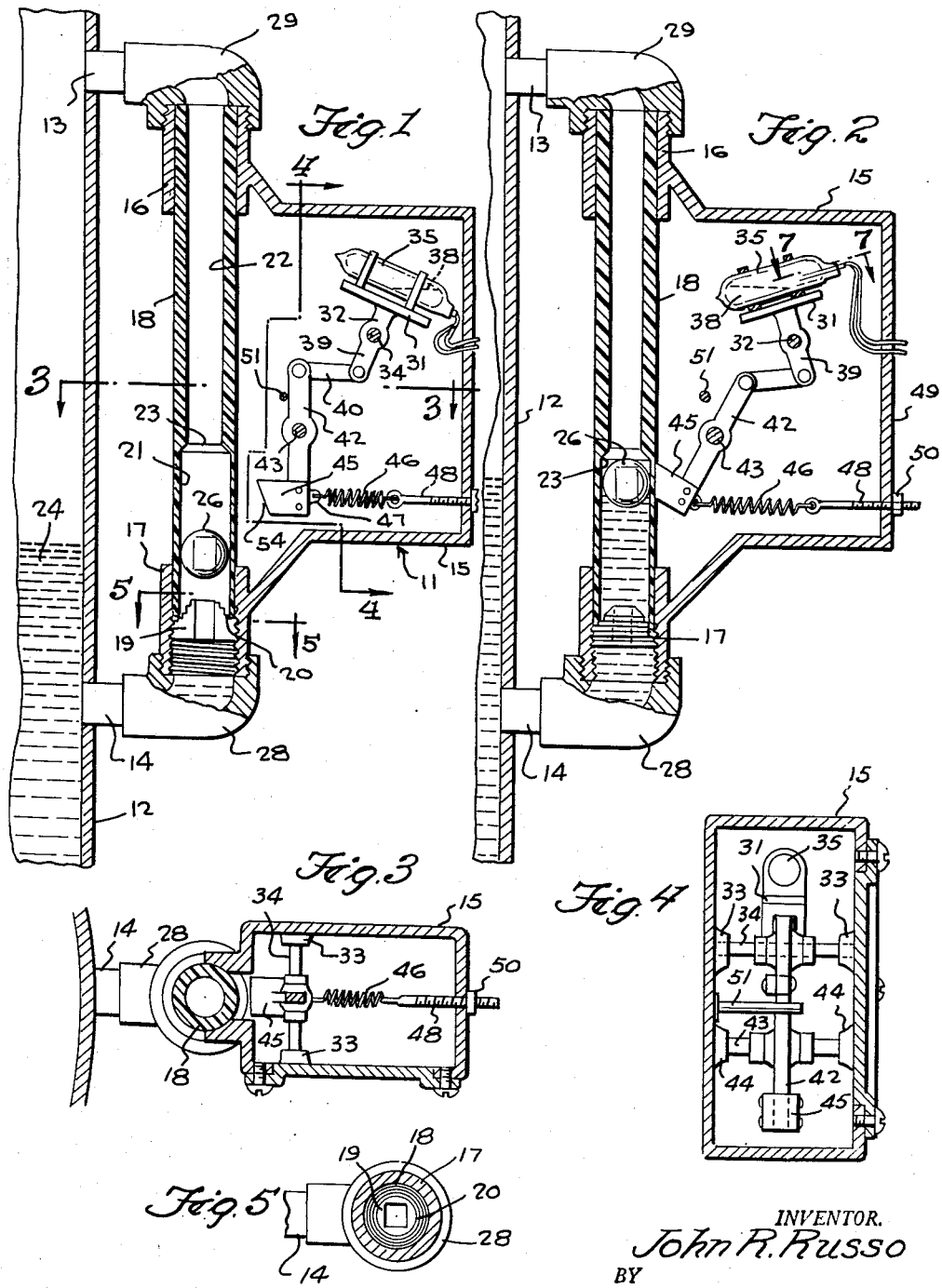
INVENTOR.
John R. Russo
BY
McMorrow, Berman & Davidson
ATTORNEYS Dec. 12, 1961 J. R. RUSSO 3,013,135
MAGNETIC FLOAT CONTROL
Filed May 6, 1960 2 Sheets-Sheet 2
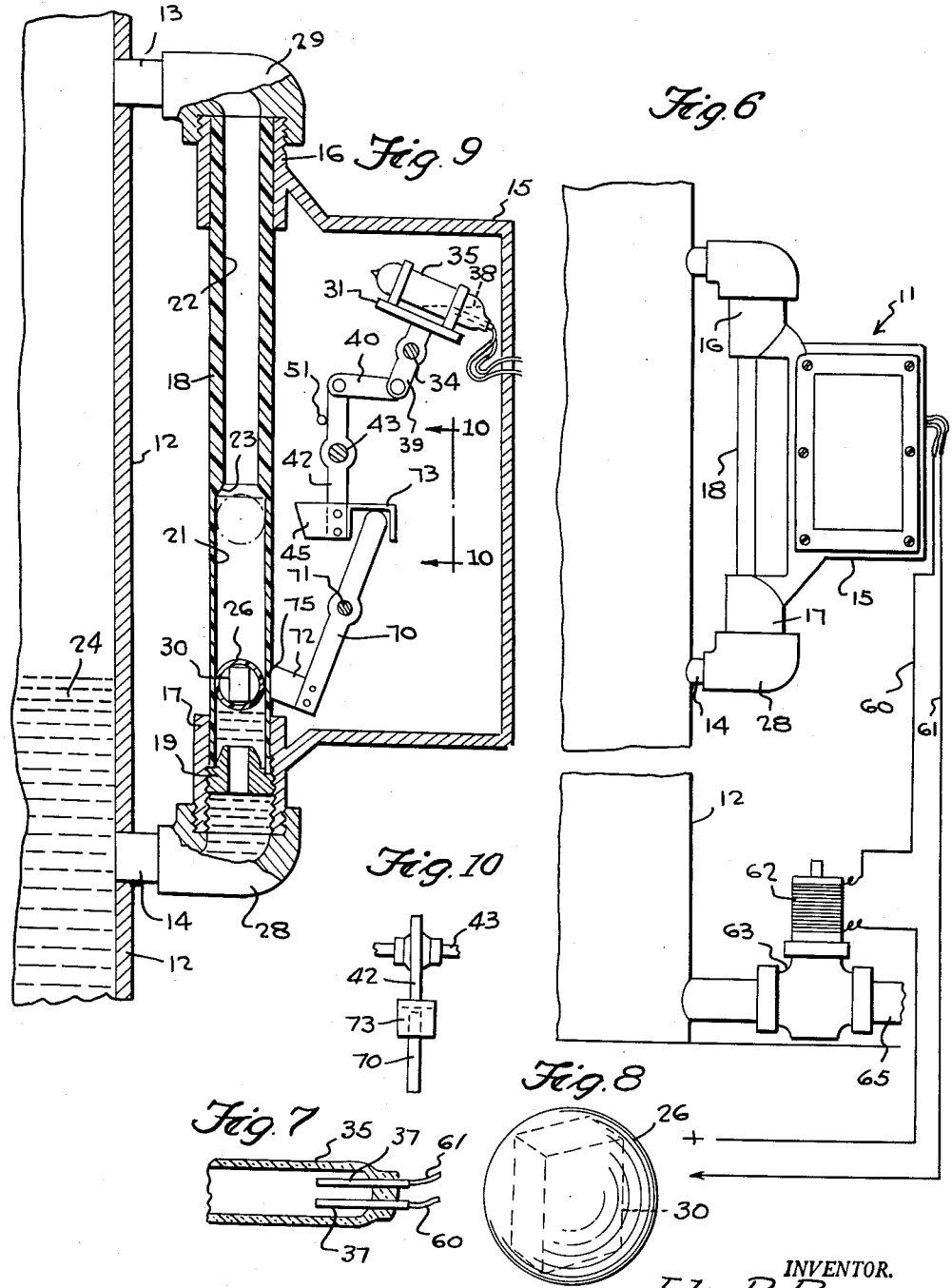
INVENTOR.
John R. Russo
BY
McMorrow, Berman & Davidson
ATTORNEYS United States Patent Office 3,013,135
Patented Dec. 12, 1961

3,013,135
MAGNETIC FLOAT CONTROL
John R. Russo, 905 Lamond Lane, Philadelphia 28, Pa.
Filed May 6, 1960, Ser. No. 27,356
5 Claims. (Cl. 200—84)

This invention relates to liquid level-responsive devices, and more particularly to a float switch assembly which is magnetically operated.

A main object of the invention is to provide a novel and improved float switch assembly which is simple in construction, which is easy to install, and which may be employed to automatically maintain a constant level or to indicate the level in a tank or other liquid receptacle.

A further object of the invention is to provide an improved float switch assembly which involves inexpensive components, which is compact in size, which is durable in construction, and which does not involve the use of exposed contacts or circuit making and breaking elements, whereby it is safe to use in locations wherein inflammable gases or vapors are present.

Further objects and advantages of the invention will become apparent from the following description and claims, and from the accompanying drawings, wherein:

FIGURE 1 is a fragmentary vertical cross sectional view taken through a portion of the wall of a tank provided with an improved float switch assembly constructed in accordance with the present invention, the switch assembly being shown arranged with the float element thereof in its substantially lowermost position.

FIGURE 2 is a vertical cross sectional view similar to FIGURE 1 but showing the float elements of the switch in its elevated, switch-operating position.

FIGURE 3 is a horizontal cross sectional view taken on the line 3—3 of FIGURE 1.

FIGURE 4 is a vertical cross sectional view taken substantially on the line 4—4 of FIGURE 1.

FIGURE 5 is a horizontal cross sectional detail view taken substantially on the line 5—5 of FIGURE 1.

FIGURE 6 is a side elevational view of the tank shown in FIGURES 1 and 2, showing the manner in which the float switch assembly is electrically connected to a solenoid valve which may be employed as the means to replenish the level of liquid in the tank when the level drops to a predetermined low point.

FIGURE 7 is an enlarged cross sectional detail view taken substantially on the line 7—7 of FIGURE 2.

FIGURE 8 is an enlarged perspective view of the hollow buoyant float member employed in the float switch assembly of FIGURES 1 to 6.

FIGURE 9 is a vertical cross sectional view, similar to FIGURE 1, but showing a modified form of float switch assembly constructed in accordance with the present invention.

FIGURE 10 is an enlarged, fragmentary elevational view, taken substantially on the line 10—10 of FIGURE 9.

Referring to the drawings, and more particularly to FIGURES 1 to 8, 11 generally designates an improved float switch assembly constructed in accordance with the present invention. The float switch assembly 11 is mounted on the wall of a liquid receptacle or tank 12, and may be mounted in place of the conventional sight glass customarily employed with the tank to indicate the level of the liquid in the tank between two predetermined points, namely, the respective upper and lower connecting points 13 and 14 shown in FIGURE 1.

The float switch assembly 11 comprises a main housing 15 which is integrally formed with respective vertically aligned sleeve members 16 and 17 in which is secured a plastic vertical tube 18, the top end of the tube being engaged in the upper sleeve member 16 and the lower end of the tube being engaged in the lower sleeve member 17, being secured therein by a hollow screw plug 19 threadedly engaged in the lower portion of the sleeve 19 and being formed with external threads 20 on its substantially conical top end portion which wedgingly engage inside the bottom end of the plastic tube 18 to lock the tube in place in the sleeve 17.

The lower portion of the tube 18 is formed with the relatively large bore 21 which communicates with the reduced upper bore portion 22 of the tube, defining an annular stop shoulder 23 between the bore portions 22 and 21. The stop shoulder 23 defines the upper permissible level of the liquid 24 in tank 12, in the form of the invention specifically illustrated herein.

Designated at 26 is a hollow buoyant float member, which may comprise a spherical plastic ball, which is disposed in the enlarged bore 21 and which is thus movable between the top end of the plug 19 and the shoulder 23, responsive to changes in the level of the liquid 24 in tank 12 between these heights. Thus, as is clearly apparent in FIGURE 1, the bottom sleeve member 17 is connected to the conduit 14 by the elbow fitting 28 and the top sleeve member 16 is connected to the upper conduit member 13 by the elbow fitting 29, whereby to place the top and bottom portions of tube 18 in communication with the corresponding top and bottom conduits 13 and 14 connected to the tank 12.

The hollow buoyant float member 26 contains a permanent magnet 30, which may be in the form of a rectangular block of permanently magnetized material, as illustrated in dotted view in FIGURE 8.

Designated at 31 is a supporting plate which is provided with a depending arm 32 pivotally mounted in the housing 15 on a transversely extending shaft member 34 extending between opposing supporting bosses 33, 33 formed in the front and rear walls of the housing.

Mounted on the plate member 31 is a mercury switch 35 which is thus rotatable with the plate member 31 from the position thereof shown in FIGURE 1 to the position thereof shown in FIGURE 2. The switch 35 includes a pair of electrodes 37, 37 which are closed by the mercury 38 contained in the switch when the switch is in the clockwise-rotated position of FIGURE 1, but which are opened when the mercury 38 moves to the opposite end of the tubular switch housing when the switch is in the counterclockwise-rotated position thereof shown in FIGURE 2.

The arm 32 is provided with a depending lower portion 39 which extends below the shaft 34. The lower end of the depending arm portion 39 is connected by a link bar 40 to the top end of an arm 42 which is pivoted at its intermediate portion on a transverse shaft 43 secured between opposing bosses 44, 44 provided on the front and rear walls of housing 15 below the opposing bosses 33, 33 as shown in FIGURE 4.

A permanent magnet 45 is secured to the bottom end of the arm 42 and is disposed sufficiently close to the tube 18 to be attracted by the permanent magnet 30 in the float member 26 when said float member rises to a position adjacent to the top stop shoulder 23.

A coiled spring 46 is connected between a lug 47 provided on the bottom end portion of arm 42 opposite the permanent magnet 45 and an adjustable eye bolt 48 which is threadedly engaged through the side wall 49 of housing 15 and which is locked in adjusted position by a lock nut 50, as shown in FIGURE 2. The spring 46 biases the arm 42 in a counterclockwise direction, as viewed in FIGURE 1, urging the arm into abutment with a transversely extending stop pin 51 mounted in the housing 15 above the shaft 43. However, the magnetic attraction which develops between the magnet 45 and the magnet 30 when the magnet 30 enters the magnetic field of magnet 45 is sufficiently strong to overcome the force of the biasing spring 46 and to cause the arm 42 to rotate in a clockwise direction, as viewed in FIGURE 1, to the position thereof shown in FIGURE 2, wherein switch 35 is opened. This magnetic attraction continues as long as the float member 26 is supported by the liquid 24 adjacent the shoulder 23. However, when the liquid level drops, the weight of the float member causes it to move downwardly, namely, in a direction substantially perpendicular to the plane of the beveled forward face 54 of the magnet 45, allowing the magnet 30 to move downwardly and out of the field of magnet 45, releasing the attraction of magnet 45 and allowing the spring 46 to rotate the arm 42 in a counterclockwise direction, namely, from the position of FIGURE 2 to the position of FIGURE 1, which causes switch 35 to open.

As will be seen from FIGURES 1 and 2, the magnet 45 is provided with the beveled front face 54 which assumes a substantially vertical position when magnet 45 comes into abutment with the plastic tube 18 in the position thereof illustrated in FIGURE 2, namely, when the float member 26 is substantially at its top limiting position. As above mentioned, when the liquid level drops, the magnet 45 is enabled to prevent the lowering of the float member 26, since the force of gravity acts in a direction parallel to the face 54 of magnet 45, so that the float member 26 drops away from the magnet 45, reducing the attraction of the magnet 45 to the tube 18 sufficiently to allow the spring 46 to rotate arm 42 to its circuit-closing position, shown in FIGURE 1.

As shown in FIGURE 6, the connecting wires 60 and 61, which are respectively connected to the electrodes 37, 37, are connected in circuit between a suitable energizing current supply and the winding 62 of a solenoid valve 63. The winding 62 becomes energized when the electrodes 37, 37 are bridged by the mercury 38, causing the solenoid valve 63 to open. The valve 63 is connected in a liquid supply line 65 which communicates through the valve with the tank 12, so that liquid is thus admitted into the tank responsive to the energization of the solenoid winding 62. The supply of liquid continues until the solenoid valve winding 62 becomes de-energized, which occurs when the float member 26 rises sufficiently to cause the magnet 45 to swing arm 42 to the position of FIGURE 2, which thus rocks the mercury switch 35 to its counterclockwise-rotated position, wherein the mercury 38 no longer bridges the electrodes 37, 37. Thus, it will be seen that the float switch assembly operates to maintain the liquid 24 constantly at a level above that of the plug element 19 and below that of the stop shoulder 23.

In the modified form of assembly illustrated in FIGURES 9 and 10, the biasing spring of the previously described form of the invention is omitted, and in place thereof a pivoted arm 70 is employed, the arm being pivotally mounted on a transverse shaft 71 provided in the lower portion of housing 15. A magnet 72 is secured to the bottom end of the auxiliary arm 70, the magnet 72 being rotatable into close proximity to the float member 26 when the float member descends to a position adjacent the plug 19, as shown in FIGURE 9. The top end of the arm 70 is received in a yoke 73 secured to the lower end portion of the arm 42 opposite the magnet 45. Thus, when the float member 26 is in its lowered position, illustrated in FIGURE 9, a substantial magnetic attraction exists between the magnet 72 and the magnet 30 inside the float member, which holds the arm 70 in a clockwise-rotated position, as viewed in FIGURE 9, thus holding the arm 42 in abutment with the stop pin 51, and holding the mercury switch 35 in its clockwise-rotated position, wherein the electrodes 37, 37 thereof are bridged by the mercury 38 in the switch. In this position, the solenoid valve winding 62 is energized, as above described, causing the valve 63 to open and allowing liquid to enter the tank 12. When the liquid level in the tank rises, the float member 26 moves upwardly in a direction parallel to that of the beveled face 75 of magnet 72, removing the attractive force from the arm 70, whereby it no longer exerts a biasing action on the arm 42. When the float member 26 rises to a position adjacent the magnet 45, a substantial attractive force develops between the magnet 45 and the float magnet 30, causing the arm 42 to be rotated in a clockwise direction, as viewed in FIGURE 9, whereby the mercury switch 35 is rotated in a counterclockwise direction to its circuit-opening position. A reverse action occurs when the level of liquid in the tank 12 drops from its upper limiting position to its lower limiting position.

It will be readily understood that the switch assemblies above described may be employed not only as circuit control means for a solenoid valve, but also to operate indicating devices or alarm devices, to control pumps, or to operate other electrical devices associated with the maintenance of a critical liquid level in a liquid container.

While certain specific embodiments of an improved float switch assembly have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A float switch assembly comprising a vertical tube, means communicatively connecting the top and bottom ends of the tube to a liquid container, a magnetic float member movably disposed in said tube, a support adjacent said tube, a plate pivoted to said support and having a depending arm, a mercury switch mounted on said plate, a second arm pivoted to said support below said first-named arm, a permanent magnet secured to one end of said second arm in a position including said float member in its field and in a position to be sufficiently attracted towards said float member to rotate said second arm responsive to a predetermined change of position of said float member in the tube, and link means connecting said arms and being constructed and arranged to operate said switch responsive to the rotation of said second arm.

2. A float switch assembly comprising a vertical tube, means communicatively connecting the top and bottom ends of the tube to a liquid container, a hollow buoyant float member movably disposed in said tube, a body of magnetic material contained in said float member, a support adjacent said tube, a plate pivoted to said support and having a depending arm, a mercury switch mounted on said plate, a second arm pivoted to said support below said first-named arm, a permanent magnet secured to one end of said second arm in a position including said float member in its field and in a position to be sufficiently attracted towards said float member to rotate said second arm responsive to a predetermined change of position of said float member in the tube, and link means connecting said arms and being constructed and arranged to operate said switch responsive to the rotation of said second arm.

3. A float switch assembly comprising a vertical tube, means to communicatively connect the top and bottom ends of the tube to a liquid container, a hollow buoyant float member movably disposed in said tube, a first permanent magnet contained in said float member, a support adjacent said tube, a plate pivoted to said support and having a depending arm, a mercury switch mounted on said plate, a second arm pivoted to said support below said first-named arm, a second permanent magnet secured to one end of said second arm in a position including said float member in its field and in a position to be sufficiently attracted towards said float member to rotate said second arm responsive to a predetermined change of position of said float member in the tube, and link means connecting said arms and being constructed and arranged to operate said switch responsive to the rotation of said second arm.

4. A float switch assembly comprising a vertical tube, means to communicatively connect the top and bottom ends of the tube to a liquid container, a hollow buoyant float member movably disposed in said tube, a body of magnetic material contained in said float member, a support adjacent said tube, a plate pivoted to said support and having a depending arm, a mercury switch mounted on said plate, a second arm pivoted to said support below said first-named arm, means biasing one end of said second arm in a direction away from said tube, a permanent magnet secured to said one end of said second arm in a position including said float member in its field and in a position to be sufficiently attracted towards said float member to rotate said second arm against the force of said biasing means responsive to a predetermined change of position of said float member in the tube, and link means connecting said arms and being constructed and arranged to operate said switch responsive to the rotation of said second arm.

5. A float switch assembly comprising a vertical tube, means to communicatively connect the top and bottom ends of the tube to a liquid container, a hollow buoyant float member movably disposed in said tube, a first permanent magnet contained in said float member, a support adjacent said tube, a plate pivoted to said support and having a depending arm, a mercury switch mounted on said plate, a second arm pivoted to said support below said first-named arm, spring means biasing one end of said second arm in a direction away from said tube, a second permanent magnet secured to said end of said second arm in a position including said float member in its field and in a position to be sufficiently attracted towards said float member to rotate said second arm against the force of said spring means responsive to a predetermined change of position of said float member in the tube, and link means connecting said arms and being constructed and arranged to operate said switch responsive to the rotation of said second arm.

References Cited in the file of this patent
UNITED STATES PATENTS

| | | |
|---|---|---|
| 2,292,648 | Moore | Aug. 11, 1942 |
| 2,440,987 | Thompson | May 4, 1948 |
| 2,503,089 | Binford | Apr. 4, 1950 |
| 2,590,680 | Campbell | Mar. 25, 1952 |